United States Patent [19]

Shaio

[11] Patent Number: 4,825,434

[45] Date of Patent: Apr. 25, 1989

[54] VARIABLE BANDWIDTH CONTROL SYSTEM

[75] Inventor: Jack Shaio, Cambridge, Mass.

[73] Assignee: GTE Laboratories Incorporated, Waltham, Mass.

[21] Appl. No.: 94,973

[22] Filed: Sep. 10, 1987

[51] Int. Cl.$^4$ ............................................. H04J 3/17
[52] U.S. Cl. ..................................... 370/80; 370/118; 375/122
[58] Field of Search ................. 370/80, 118, 60, 89, 370/104, 58, 94, 110.1; 375/122

[56] References Cited

U.S. PATENT DOCUMENTS

| | | | |
|---|---|---|---|
| 4,445,116 | 4/1984 | Grow | 370/118 |
| 4,679,191 | 7/1987 | Nelson et al. | 370/118 |
| 4,707,826 | 11/1987 | Froggett | 370/60 |
| 4,707,831 | 11/1987 | Weir et al. | 370/60 |

Primary Examiner—Robert L. Griffin
Assistant Examiner—Frank M. Scutch, III
Attorney, Agent, or Firm—James J. Cannon, Jr.

[57] ABSTRACT

An NpR variable bandwidth control system comprises a class of systems specifically designed to control the access to a T1 link by traffic types that require different fractions of the transmission facilities simultaneoulsy. These systems can be incorporated into the software that is used to control DSC based T1 networks for special services. Essentially, wideband messages such as video signals are transmitted one at a time, whereas low bit rate data signals such as voice are transmitted in parallel. Such a form of transmission makes economical sense in the transmitting of such signals. A proportion p is applied to one of the group so that all data is equitably handled.

5 Claims, 7 Drawing Sheets

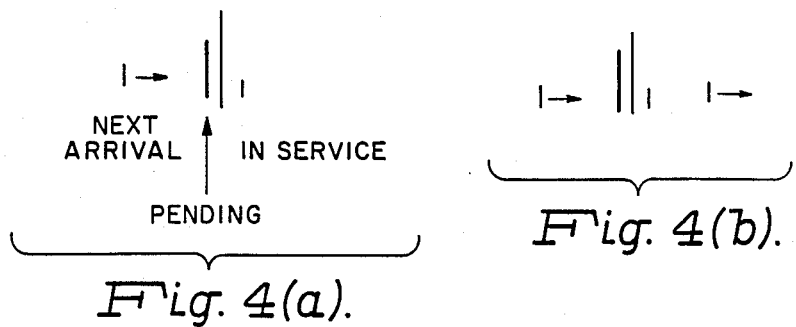
Fig. 4(a).
Fig. 4(b).
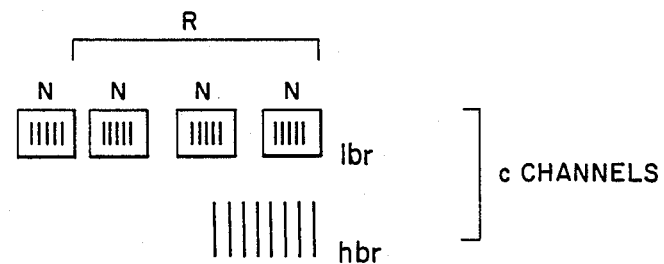
Fig. 5.

VARIABLE BANDWIDTH CONTROL SYSTEM

BACKGROUND OF THE INVENTION

1. Field of the Invention

This invention relates to a variable bandwidth control system and, in particular, to a method of controlling access to a communications link by traffic types that require different fractions of transmission facilities simultaneously. Accordingly, it is a general object of this invention to provide new and improved systems and methods of such character.

2. General Background

Some available software releases used in telecommunications utilize a First In First Out (FIFO) scheme in which traffic requests are served in the order in which they arrive, regardless of the transmission capacity that each request utilizes. Disadvantageously, minimal or no effort is made to separate traffic types by the required amount of bandwidth.

Two other schemes, proposed (in a different context) in an article by B. Kraimeche and M. Schwartz, IEEE J. Select. Areas in Comm., vol SAC 4, September 1986, include:

M1—allows wider band traffic to preempt narrowband requests.

M2—wider band traffic is given priority over narrowband, but preemption is not allowed.

The foregoing prior systems lack certain desirable features. For example, FIFO causes inefficient use of the transmission facility because narrowband traffic requests that arrive between wideband traffic requests cannot be initially grouped and then served. Thus, the transmission facility is utilized with less than 100% effectiveness even when there are pending serviceable traffic requests.

T1 networks are private line networks using T1-carrier (1.544 Mbs digital transmission facilities) and reconfigured ("slow switched") using Digital Cross-Connect Systems (DCS). However, M1 is not practical for T1 networks as it carries business services that cannot be preempted, once begun and subsequently served.

M2 allows for small increases in wideband traffic to have a disproportionate impact on narrowband traffic, although the wideband traffic may be sufficiently important to a network provider to deserve a higher grade of service. M2 cannot be adjusted to accommodate such a requirement.

The foregoing systems, FIFO, M1 and M2, are fixed control policies, and cannot be graduated to reflect the changing importance of traffic offered to a transmission facility.

OBJECTS AND ADVANTAGES OF THE INVENTION

Another object of this invention is to provide an adjustable system that can allocate the T1 transmission facility among traffic requests that utilize different percentages thereof.

Still another object of the invention is to provide for a new and improved system that can be adjusted to favor either narrowband or wideband traffic requests, and to do so in varying degrees, rather than favoring one type at the exclusion of the other.

Yet another object of this invention is to provide for a new and improved system in which a network provider is permitted to group a plurality of narrowband requests, so as to make fuller use of a facility, as well as to limit the amount of narrowband requests served simultaneously, so as to improve the performance of wideband requests.

Still yet another object of this invention to provide a network provider with disciplines that control the grade of service offered to each request type, that is, the ability to favor one type of request over the other, and to do so in varying degrees, thereby providing the network with the flexibility to pick different levels of grade of service for each size of request without making a priori decisions on which type of request is more important.

The advantages of this invention over the prior art include:

1. Explicitly takes into account the different bandwidth requirements of traffic requests before allocating transmission capacity thereto (not done in FIFO).

2. Permits the option of grouping together several narrowband requests before giving access to a T1 link so as to improve the use of the transmission facility (not done in FIFO).

3. Permits the network provider to decide, in either a fixed or real time basis, the relative importance of wideband to narrowband requests and to allocate transmission facilities in exactly such a proportion (not done in FIFO, M1, or M2).

4. The network provider is given the ability to limit the number of narrowband requests served simultaneously, thus indirectly improving the performance of the wideband requests (not done in FIFO, M1 or M2).

5. Provides for a minimum threshold of narrowband requests which is served only when such threshold is reached. This gives wideband requests the impression that the T1 is unoccupied but does not seriously affect the narrowband requests as they can all be served simultaneously. This prevents the T1 link from being committed to serving narrowband requests when they cannot fill up a significant portion of the link (not done with FIFO or M2).

6. Permits the transmission link to empty itself prior to putting more narrowband requests to service, thereby improving the grade of service offered to wideband requests and increasing the number of narrowband requests that is served jointly (not done in FIFO, M1, or M2).

SUMMARY OF THE INVENTION

In accordance with one aspect of the invention, a method of controlling access to a communications link by traffic types that require different fractions of transmission facilities simultaneously is set forth. The method includes the step of separating arriving traffic requests into respective bandwidth categories that can accommodate traffic types that are narrowband and wideband. The method includes allocating one bandwidth portion of the link to narrowband request traffic types that require a smaller one of the fractions of transmission facilities, and allocating a greater bandwidth portion of the link to wideband request traffic types that require a larger one of the fractions of transmission facilities. The method includes ignoring requests for the one bandwidth portion when the number of them is less than a minimum threshold N, where N is a positive integer. When at least N requests for the one bandwidth portion is present, R representing the number of batches of N requests which can be served in parallel the decision to serve narrowband or wideband requests performed by requiring that a fraction p of those decisions should favor the wideband while the remaining 1−p should favor the narrowband. In the immediate foregoing step, when narrowband requests are to be served, they are served jointly N×R at a time (or the number present if less than N×R), but always in multiples of N. Thus, access to the communications link is permitted only when all requests in service have been completed.

Thus, when N=4 and R=3, either 4, 8, or 12 narrowbands can be served jointly. N×R is then the maximum number of narrowband traffic requests that can be served in parallel. When more than N×R channels are available, they become, in effect, reserved for wideband requests.

BRIEF DESCRIPTION OF THE DRAWING

Other objects, advantages, and features of this invention, together with its mode of operation, will become more apparent from the following description, when read in conjunction with the accompanying drawing, in which:

FIGS. 4(a) and 4(b) are diagrams illustrating the shortcomings of the maximize busy servers system of the prior art;

FIG. 5 is a chart illustrating the priority disciplines of the invention;

FIG. 7 is a diagram illustrating the effect of varying R, the number of low bit rate batches served in parallel, vs. average delay in multiples of service time;

DESCRIPTION OF PREFERRED EMBODIMENT(S)

This invention relates to a queueing system with identical servers (channels), and two classes of customers. One class, the low bit rate such as required for voice transmission, requires only one channel per customer. The other class, the high bit rate such as video, requires all servers to begin service. Upon completion of a high bit rate service, all channels are released simultaneously. Blocked requests of either type are queued. The performance of a three parameter class of queueing disciplines for allocating the use of channels among the two very different customer classes is described hereinbelow as the NpR disciplines.

NpR disciplines give the network provider great flexibility in favoring one type of requests over the others and in doing so in varying degrees.

Such a queueing system provides for a variety of telecommunications services, specifically, bandwidth on demand in an integrated network can be provided. How should channels on a link be shared among single channel requests, low bandwidth such as voice, and multi-channel, high bandwidth requests such as high definition TV?

An impetus for this invention is the desire for automated provisioning of special services including private lines, multi-point connections, video conferences, and high bandwidth data connections which impose greater demands on the network than ordinary telephone service. Setting up or rearranging connections can be performed automatically with the emergence of Digital Cross-Connect systems (DCS) services in which the DCS handle the switching, whereby special services would be initiated only for the time they were needed.

Figure 1:
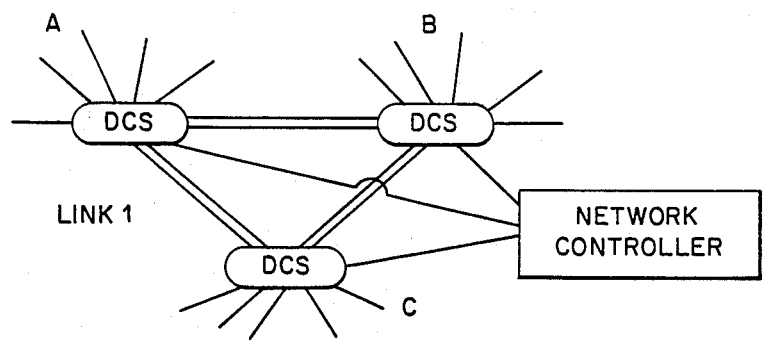
FIG. 1 is, a diagram of a Digital Cross-Connect System (DCS) network with customer control.

Referring to FIG. 1, which illustrates a DCS network with customer control, a single customer (such as business) typically has many user locations or divisions connected to each DCS, each with access to a network controller. The customer can limit use of inter-DCS lines to permanently leased facilities and utilize the customer control feature to offer a virtual (shared) private line service to his locations. Alternatively, the customer control feature can be utilized to provide inter-DCS lines as well, selected from a pool of facilities shared by different users. As the customer locations have holding and inter-arrival times of hours rather than months, a dynamic special services network operates in almost real time. In the network illustrated in FIG. 1, a rapid change in special service connection can cause a high amount of churn in link 1. A customer can request that its connections between DCS A and DCS B be disconnected and new connections be set up between DCS A and DCS C. As a result, there is no net gain in active special circuits, but there is a great deal of connect and disconnect activity on link 1.

Control algorithms allocate network resources among many different types of requests. These algorithms reside in network control point, and may be utilized to control use of common facilities shared by several customers. One component of such a network management system includes access control to a single inter-DCS link by variable bandwidth special service requests. The NpR disciplines described herein address the problem of variable bandwidth allocation.

Basic Model for Variable Bandwidth Allocation

Figure 2A:
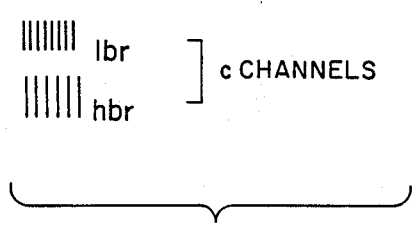
FIG. 2a is, diagram of a queueing system which is a subsystem of a DCS link model shown in FIG. 2b.
Figure 2B:
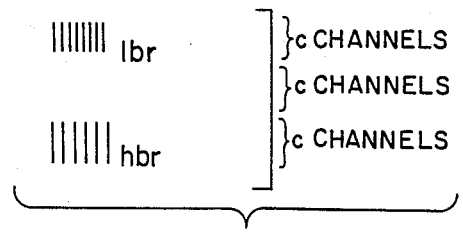

A queueing system of the prior art is shown in FIG. 2a. That queueing system is a subsystem of the inter-DCS link model shown in FIG. 2b. In this basic model c channels are available (that is, one c channel group), and customers may request one or c channels.

For a high bit rate hbr (such as video) to enter service, all channels must be available. The high bit rate data then uses the full channels simultaneously throughout their service and releases all of them upon service completion. A low bit rate lbr signal such as voice requires only one channel, thus several low bit rate signals can be served together in parallel with resulting economies in total service time, but only one high bit rate (such as video) at a time can be served. Clearly, unless a priority discipline makes it more difficult for the low bit rate service to enter service, the low bit rate has a great advantage over the high bit rate in seizing a channel and entering service.

Two examples illustrate the peculiar nature of such a queueing system.

Figure 3:
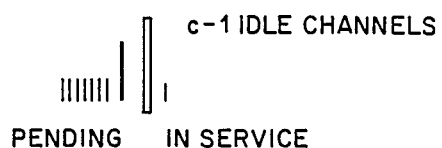
FIG. 3 is a diagram illustrating an example of a First In First Out program system.

First In First Out: Customers are served in their order of arrival, regardless of their bandwidth requirements. The shortcomings of this discipline are evident from FIG. 3, where one low bit rate in service (and all-minus-one idle channels) blocks a high bit rate, which, in turn, blocks all later low bit rate arrivals from using any of the all-minus-one idle channels. As the high bit rate traffic increases significantly, fewer low bit rates will be caught between two high bit rates (and so, served in parallel). Thus, a second undesirable feature of the First In First Out discipline is that as the high bit rate traffic increases, the low bit rate traffic is processed more inefficiently, further increasing the strain on network resources.

Maximize Busy Servers: One attempt to improve over FIFO is to disregard the order of arrival and instead try to maximize, at every point in time, the number of busy servers (subject to non-preemptive priority). In the situation depicted in FIG. 3, this would permit the blocked low bit rate traffic to jump to the head of the line and then to service. FIGS. 4(a) and 4(b) illustrate the shortcomings of such a discipline. The low bit rate traffic trickles in at a rate of 1/hour, the service time is 1.000001 hours, and there is a low bit rate traffic already in service. With such a priority discipline, there is always a low bit rate traffic in service; just before this low bit rate leaves, a new one arrives to take its place. Thus, the high bit rate traffic is completely blocked out of the system although time-average utilization is only 1/c, where c is the number of channels. A second difficulty with such a discipline is that it has "too much memory". In the example depicted in FIG. 4(b), the arriving low bit rate traffic enters service because the present low bit rate traffic blocks all high bit rate traffic by being in service, and in turn, the current low bit rate is in service because the previous low bit rate was already in service, reserving the system for future low bit rate arrivals. This suggests that such a discipline would not return quickly to a stable state after a short overload of traffic, a further disadvantage of that discipline.

NpR Priority Disciplines

The NpR disciplines, as developed, provide for greater control over the grade of service offered to the high bit rate and low bit rate requests. They depend on two integral parameters (N,R) and one probability (p); each of these parameters can be adjusted independently of the others, and results in a different discipline of NpR type. The meaning of these parameters is as follows and is illustrated in FIG. 5.

The low bit rate is served only in batches of N, where N is a minimum threshold number of low bit rate request required to initiate service. If there are less than N low bit rates in queue, they cannot enter service, even if the servers are idle and there are no high bit rates present. N is thus the minimum threshold old which the low bit rate queue must pass before it can receive service.

There is gating service; that is, after a decision is made on the number and type of the next entries into service, no other requests can enter service until the server channels have cleared. This improves the chances of a high bit rate entering service as the only requests that could be served while some channels are occupied are the low bit rate as shown in FIG. 4(a). After the server channels are the decision to serve narrowband (low bit rate) or wideband (high bit rate) requests is done by requiring that a fraction p of those decisions should favor the wideband, while the remaining $1-p$ should favor the narrowband. An equivalent scheme is to require that when a choice is made cleared, with probability p, a high bit rate is served next, with probability $\bar{p} = 1 - p$, low bit rates are served.

When the decision is to serve low bit rates, they are served in batches of N, up to a maximum of R low bit rate batches at a time, N number of lbr served $N \times R$. This extra parameter R makes it possible to have a low value N (small minimum threshold for low bit rates to enter service), yet also serve many (N,R) low bit rates in parallel, simultaneously. It also helps to limit the amount of work performed on the low bit rate queue in cases when large values of p, by themselves, are insufficient.

There are two levels of priority to be considered: On a direct level, the variable p determines which class of request (low bit rate or high bit rate) will be next served. When the decision is to serve a low bit rate signal, then N and $N \times R$ determine the minimum and maximum number of low bit rate signals that will be served before another decision on service entries is made, N number of lbr served $N \times R$. Thus, N and R also determine the minimum and maximum amount of work that can be done on the low bit rate queue between service completions.

For an effective discipline, the following three tasks should be accomplished. First, it should force the low bit rates to accumulate before allowing them to seize the servers (performed with the parameter N of the NpR disciplines). Second, it should limit the number of low bit rates that can trickle in during other low bit rate services (performed with the gating service and the parameter R of the NpR disciplines). Third, it should decide between low bit rates and high bit rates when choosing entries into service (performed with the parameter p of the NpR disciplines). The NpR disciplines, thus, are a convenient class of priority disciplines which meet these three requirements.

Simulation Results

Figure 6:
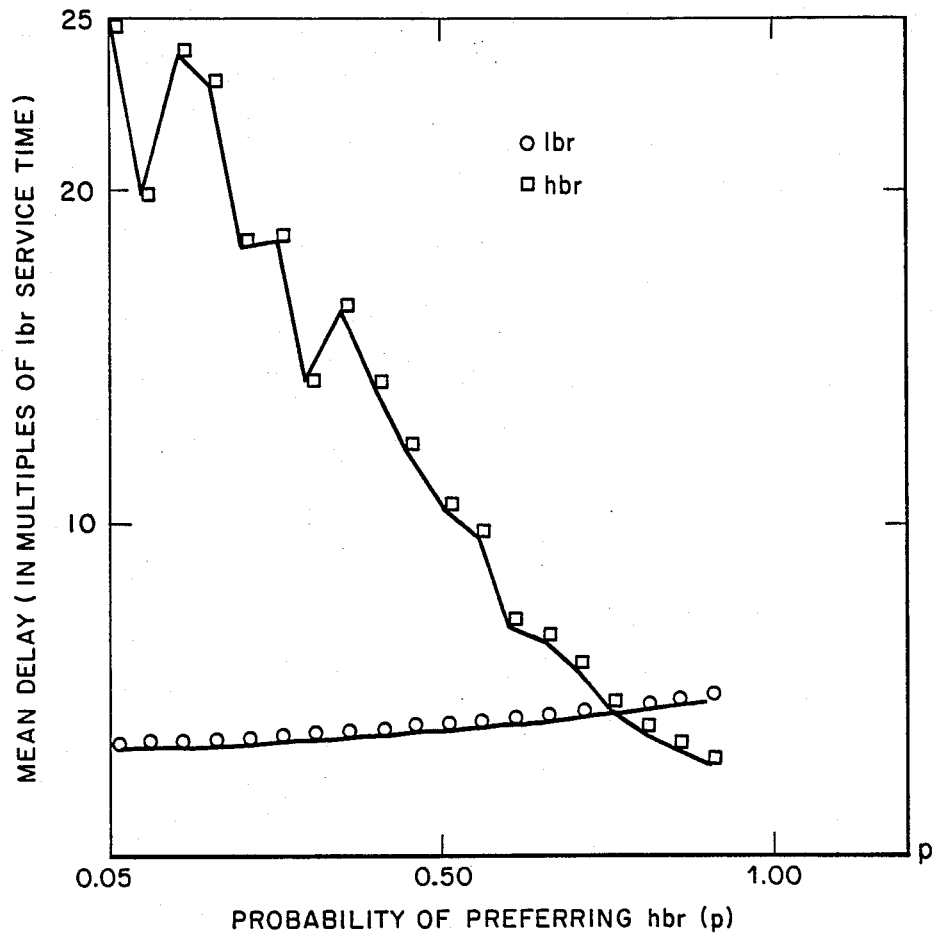
FIG. 6 is a diagram illustrating the effect of varying the probability rate p vs. mean delay in multiples of service time.
Figure 2:
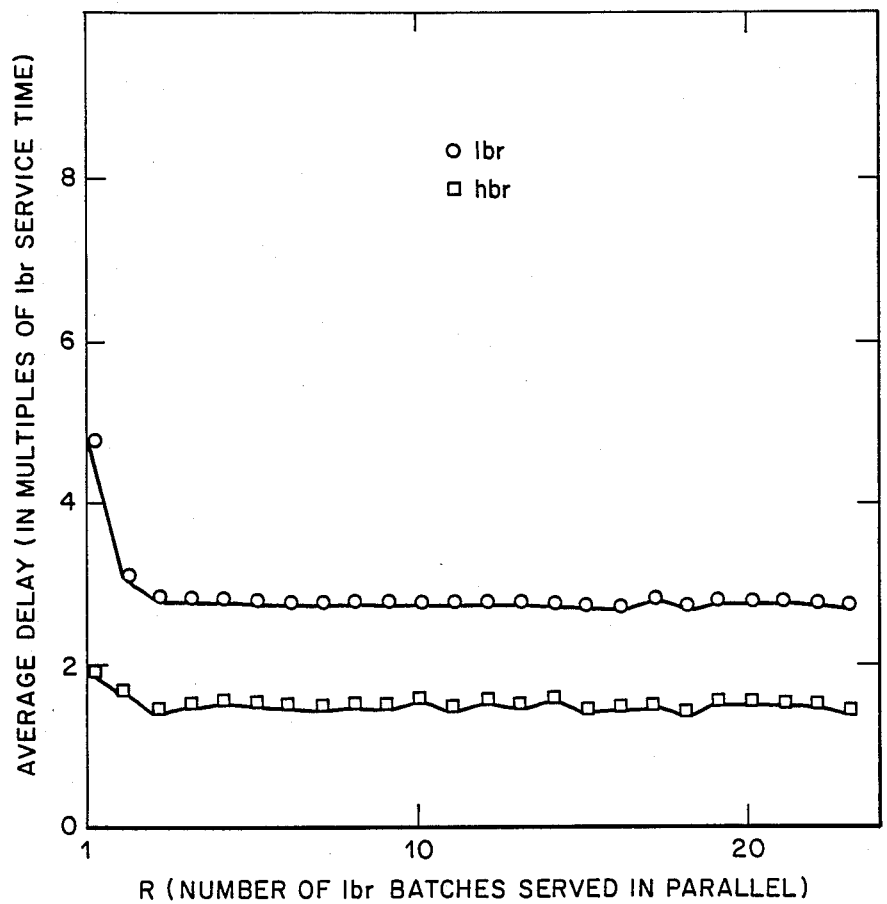

FIG. 6 illustrates the effect of varying p, from 0.05 to 0.95 with all other parameters held constant. In this example $N \times 4$, $R \times 6$ and $C \times 24$; an arrival rate of 0.9 erlangs and service time of 1.0 is assumed for low bit rate service; and an arrival rate of 0.6 erlangs and service time of 0.5 are assumed for high bit rate service. As shown, there is a sharp drop in high bit rate delay as p increases. However, there is only a slight increase in low bit rate delay. This is because as p increases, the low bit rate queue is more likely to back up, so that more low bit rates are served in parallel. That is, as p increases, the low bit rate has a lower priority but they enter a more efficient system so their delay is not severely affected.

Figure 8:
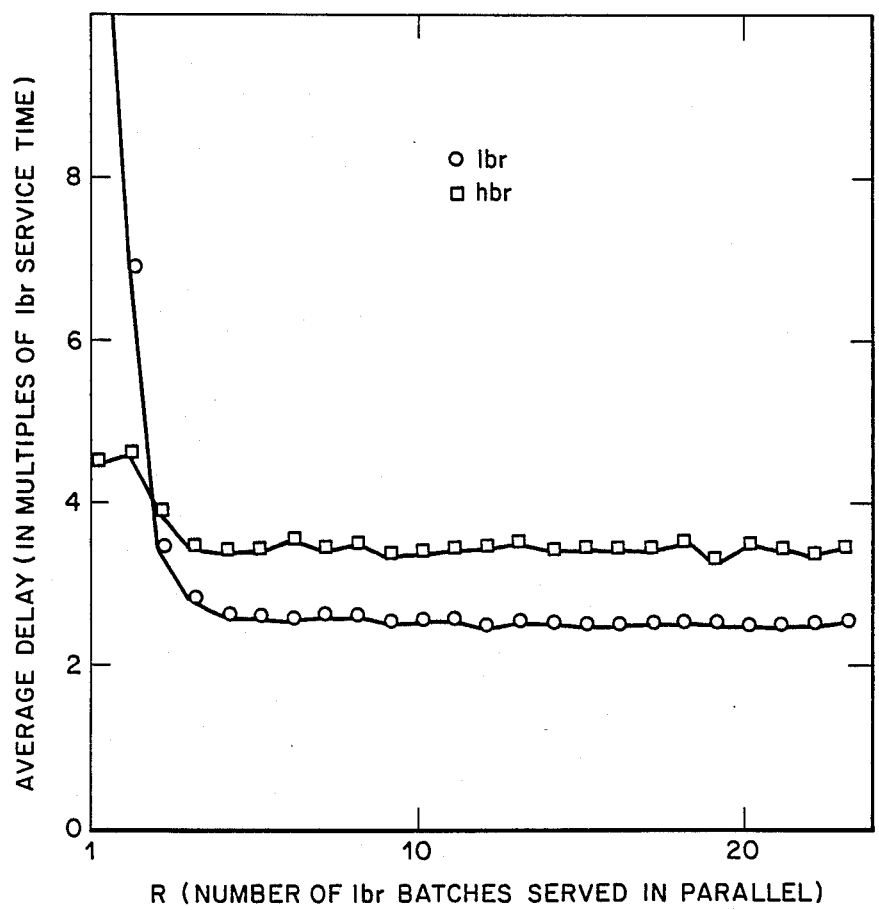
FIGS. 8 and 9 are diagrams of R vs. average delay as the system becomes more heavily loaded.
Figure 9:
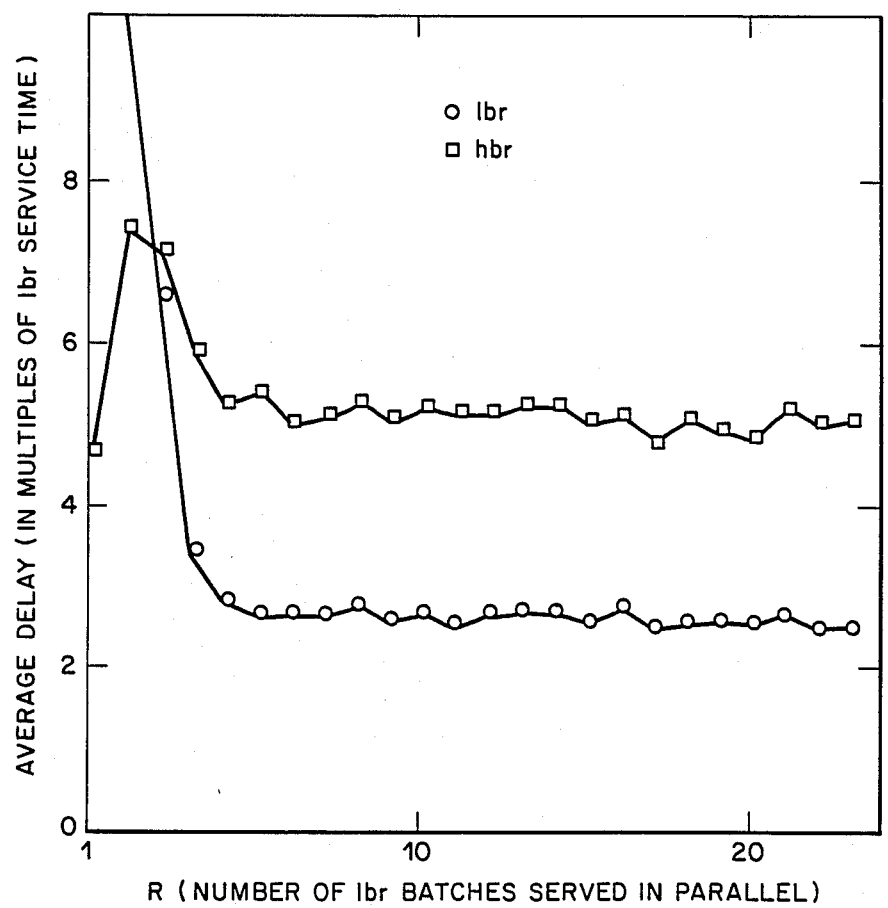

FIG. 7 illustrates the effect of varying R. In this p is assumed to be 0.75 and all other parameters are fixed at the same values as in FIG. 6. Note, there is a point $R=4$ at which increasing R has little effect on delay, especially low bit rate delay. As R is a maximum number of low bit rate batches that can be served in parallel, when R is large and the system is not heavily loaded, it is unlikely that R low bit rate batches would accumulate between successive service discharges, so usually less than R low bit rate batches would be served in parallel. A further increase in R has little effect on the system. As the system becomes more heavily loaded, that is, the arrival rates of low bit rate service requests are increased to 1.8 erlangs (FIG. 8) and 2.4 erlangs (FIG. 9), with all other parameters having the same values as in FIG. 7, the value of R, wherein the delay vs. R curve flattens, also increases, as seen in FIGS. 8 and 9.

Figure 10:
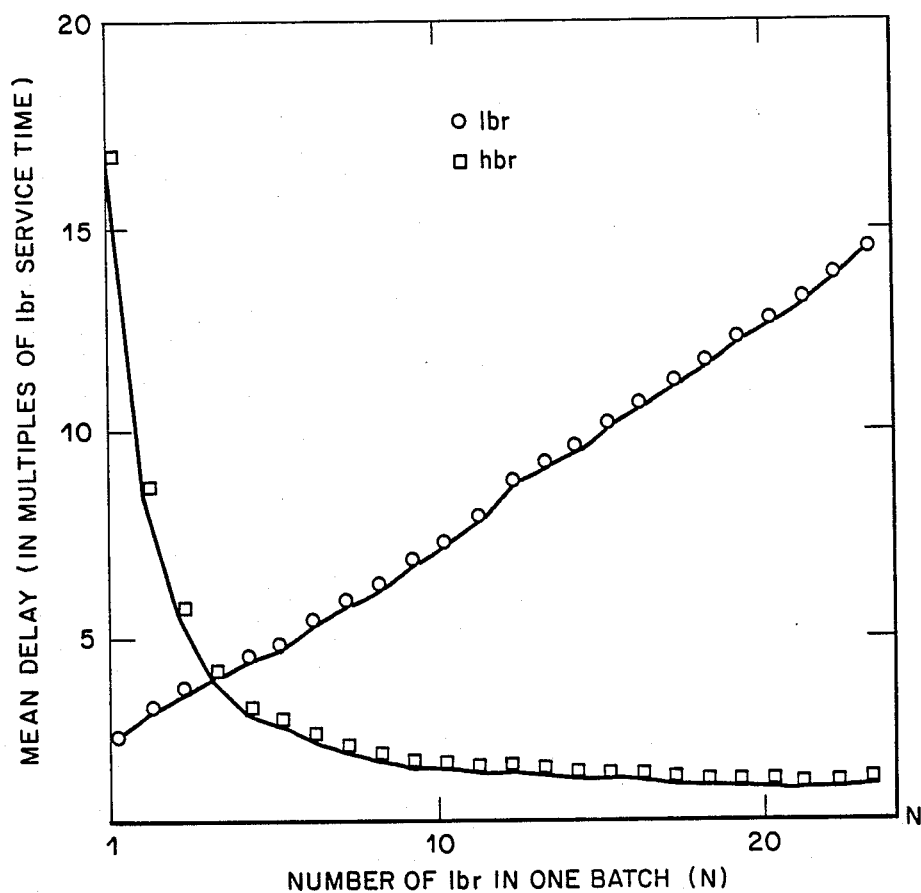
FIG. 10 is a diagram illustrating the effect of varying N and R simultaneously while keeping N×R as close as possible to 24.

FIG. 10 illustrates the effect of varying N and R simultaneously, while keeping $N \times R$ as close as possible to 24. All other parameters have the same values as in FIG. 6. As the low bit rate delay increases almost linearly in N (showing that the assembly time of the batches, $N/2\lambda_{lbr}$ is dominant), the sharp increase in low bit rate delay occurs in going from N=12 (R=2) to N=13 (R=1). It becomes more pronounced with heavier low bit rate traffic loadings.

The foregoing simulation results indicate that the class of NpR priority disciplines are effective in allocating grade of service among the different sizes of requests.

The system described herein in accordance with this invention using the NpR disciplines can be adjusted to favor either the narrowband or wideband traffic requests and to do so in varying degrees rather than favoring one type at the exclusion of the other. The system also permits the network provider to group many narrowband requests together, so as to make full use of the facility as well to limit the number of narrowband requests served simultaneously thereby improving the performance of wideband requests.

CONCLUSION

The structural and functional operations of the invention in summary:

1. The NpR control system on a T1 link is implemented by means of two integral thresholds (N,R) and one probability (p).

2. Arriving traffic requests are separated into narrowband (DS 0 rate) and wideband (DS 1 rate) prior to allocating any part of the T1 link to them.

3. Narrowband requests are not considered for service unless the number of them accumulated equals or exceeds the minimum threshold N.

4. Assuming that at least N narrowbands are present, the decision to serve narrowband or wideband requests is performed by requiring that a fraction p of those decisions should favor the wideband, while the remaining 1−p should favor the narrowband. An equivalent scheme is to require that when the choice is made with probability p it is wideband and with probability 1−p it is narrowband.

5. When narrowband requests are to be served, they are served jointly, N×R at a time (or the number present if less than N×R), but always in multiples of N. So when N=4 or R=3, either 4, 8, or 12 narrowbands can be served jointly. N×R is then the maximum number of narrowband traffic requests that are served in parallel. When more than N×R channels are available, they become, in effect, reserved for wideband requests.

Access to T1 is permitted only when all requests in service have been completed, i.e., access is not permitted to a partially filled T1.

This invention is expressly designed for DCS based T1 networks for special services. Other integrated networks cannot use this system as they are delay intolerant (real-time video or voice signals cannot be delayed without degradation). However, special service transmission requests can be delayed.

Various features of this invention that are believed to be new include the following:

Separating arriving traffic requests by the amount of bandwidth that they require so as to reorder them before inputting them to the DCS network controller; Also, setting minimum (N) and maximum (N×R) thresholds on the number of narrowband requests served at one time; and, allowing requests to enter service only when the T1 link completely frees up.

The specific features, which applicant considers to be new, are covered in the appended claims.

What is claimed is:

1. A method of controlling access to a communication link by traffic types that require different fractions of transmission facilities simultaneously comprising the steps of
   separating arriving traffic requests into bandwidth categories of narrowband and wideband;
   allocating a first bandwidth portion of said link to narrowband request traffic types that require a smaller one of said fractions of transmission facilities, and allocating a second greater bandwidth portion of said link to wideband request traffic types that require a larger one of said fractions of transmission facilities;
   ignoring requests for said first bandwidth portion when the number of said requests is less than a minimum threshold N, where N is a positive integer;
   when at least N requests for said first bandwidth portion are present, deciding to serve narrowband or wideband requests by requiring that a fraction p of those decisions should favor the wideband, while the remaining 1−p should favor the narrowband; and
   when narrowband requests are to be served, serving narrowband requests jointly N×R at a time, or the number present if less than N×R, R representing the number of batches of N requests which can be served in parallel, but always in multiples of N;
   access to said communications link is permitted only when all requests in service have been completed.

2. A method of controlling access to a communications link by traffic types that require different fractions of transmission facilities simultaneously, said method being used in a digital cross-connect system (DCS) network that utilizes facilities rearrangements and on-demand private networks, comprising the steps of
   separating arriving traffic requests into bandwidth categories of narrowband and wideband;
   allocating a first bandwidth portion of said link to narrowband request traffic types that require a smaller one of said fractions of transmission facilities, and allocating a second greater bandwidth portion of said link to wideband request traffic types that require a larger one of said fractions of transmission facilities;
   ignoring requests for said first bandwidth portion when the number of said request is less than a minimum threshold N, where N is a positive integer;
   when at least N requests for said first bandwidth portion are present, deciding to serve narrowband or wideband requests by requiring that a fraction p of those decisions should favor the wideband, whole the remaining 1−p should favor the narrowband; and
   when narrowband requests are to be served, serving narrowband requests jointly N×R at a time or the number present if less than N×R, R representing the number of batches of N requests which can be served in parallel, but always in multiples of N; wherein
   access to said communications link is permitted only when all requests in service have been completed.

3. A method of controlling access to a T1 communications link network, in a digital cross-connect system (DCS) wherein said system includes a network controller comprising the steps of separating arriving user command requests before arrival at said network controller of said link network based on the amount of bandwidth each request requires, and then rearranging said requests, in a different order from their arrival, by deferring service of one category until a minimum threshold number of request of said one category are queued for service to improve performance of said network.

4. The method as recited in claim 3 wherein a plurality of narrow bandwidth user command requests requires the same bandwidth as a sole wide bandwidth user command request.

5. The method as recited in claim 1 wherein, for variable bandwidth, said requests are rearranged according to the variable N, p, and R set forth therein.

* * * * *